United States Patent
Raymond

(10) Patent No.: US 11,298,996 B2
(45) Date of Patent: Apr. 12, 2022

(54) ARTICULATION SYSTEM FOR COMMERCIAL ROAD VEHICLES

(71) Applicant: PANTERO TECHNOLOGIES INC., Montreal (CA)

(72) Inventor: Jean Raymond, Montreal (CA)

(73) Assignee: PANTERO TECHNOLOGIES INC., Montreal (CA)

( * ) Notice: Subject to any disclaimer, the term of this patent is extended or adjusted under 35 U.S.C. 154(b) by 337 days.

(21) Appl. No.: 16/616,110

(22) PCT Filed: May 24, 2018

(86) PCT No.: PCT/CA2018/050604
§ 371 (c)(1),
(2) Date: Nov. 22, 2019

(87) PCT Pub. No.: WO2018/218340
PCT Pub. Date: Dec. 6, 2018

(65) Prior Publication Data
US 2020/0094637 A1 Mar. 26, 2020

Related U.S. Application Data

(60) Provisional application No. 62/512,334, filed on May 30, 2017.

(51) Int. Cl.
*B60D 5/00* (2006.01)
*B62D 47/02* (2006.01)

(52) U.S. Cl.
CPC ........... *B60D 5/006* (2013.01); *B62D 47/025* (2013.01)

(58) Field of Classification Search
CPC ........ B60D 5/006; B60D 5/00; B62D 47/025; B61D 17/20; B61F 5/16
(Continued)

(56) References Cited

U.S. PATENT DOCUMENTS 566,712 A * 8/1896 Cooper ................. B61F 5/16
105/4.1
1,499,510 A * 7/1924 Elliott ................. B61F 5/16
105/3
(Continued)

FOREIGN PATENT DOCUMENTS

CA 2910656 5/2016
CH 389005 A * 3/1965 ............ B61D 17/20
(Continued)

*Primary Examiner* — Jacob D Knutson
*Assistant Examiner* — Myles A Harris
(74) *Attorney, Agent, or Firm* — Norton Rose Fulbright Canada LLP

(57) ABSTRACT

An articulation system (1) for interconnecting first and second vehicle units of an articulated road vehicle comprises a central element (2) including a vertical cylinder with left and right arcuate walls (4) extending between two facing openings. First and second interconnecting structures (5) are joined to the central element (2) and are adapted to be respectively attached to the first and second vehicle units on opposed sides of the central element (2). Each interconnecting structure has a pitch joint member (5a) and a yaw joint member (5b). The pitch joint member (5a) has a frame (7) perpendicular to a longitudinal axis of a corresponding one of the first and second vehicle units and a pitch hinge mechanism (6) at a floor level to interconnect with the corresponding one of the first and second vehicle units. The yaw joint member (5b) has a frame (8) perpendicular to the longitudinal axis of the corresponding one of the first and second vehicle units and left and right arcuate walls juxtaposed to the left and right arcuate walls (4) of the vertical cylinder and rotatable therearound. The frame (7) of the pitch joint member (5a) and the frame (8) of the yaw joint member (5b) are juxtaposed and mechanically linked to jointly form a planar roll joint mechanism.

13 Claims, 11 Drawing Sheets

(58) Field of Classification Search
USPC .......................... 280/403, 424; 105/8, 3, 8.1
See application file for complete search history.

(56) References Cited

U.S. PATENT DOCUMENTS

| | | | | | |
|---|---|---|---|---|---|
| 1,501,325 | A | * | 7/1924 | Elliott | B61D 17/20 |
| | | | | | 105/4.1 |
| 1,617,667 | A | * | 2/1927 | Clark | B61F 5/16 |
| | | | | | 105/4.1 |
| 1,642,959 | A | * | 9/1927 | Koch | B61F 5/16 |
| | | | | | 105/4.1 |
| 1,644,394 | A | * | 10/1927 | Pehrson | B61F 5/16 |
| | | | | | 105/4.1 |
| 1,731,122 | A | * | 10/1929 | Brooks | B61F 5/16 |
| | | | | | 105/4.1 |
| 1,894,665 | A | * | 1/1933 | Christiansen | B61F 5/16 |
| | | | | | 105/4.1 |
| 2,015,802 | A | * | 10/1935 | Koch | B61F 5/16 |
| | | | | | 105/4.1 |
| 2,056,227 | A | * | 10/1936 | Mussey | B61F 5/16 |
| | | | | | 105/4.4 |
| 2,107,881 | A | * | 2/1938 | Beardsley | B60D 5/00 |
| | | | | | 280/403 |
| 2,158,062 | A | * | 5/1939 | Blomberg | B61F 5/16 |
| | | | | | 105/4.1 |
| 2,268,318 | A | * | 12/1941 | Urbinati | B61F 3/12 |
| | | | | | 105/4.1 |
| 2,843,417 | A | * | 7/1958 | Wahl | B60D 5/00 |
| | | | | | 280/403 |
| 3,922,971 | A | * | 12/1975 | Maroshick | B61F 5/16 |
| | | | | | 105/4.1 |
| 4,269,425 | A | * | 5/1981 | Konig | B62D 47/025 |
| | | | | | 105/8.1 |
| 4,405,143 | A | * | 9/1983 | Rosenkrands | B60D 5/00 |
| | | | | | 105/18 |
| 4,421,339 | A | * | 12/1983 | Hagin | B62D 47/025 |
| | | | | | 280/460.1 |
| 4,781,123 | A | * | 11/1988 | Yoshihara | B61D 17/20 |
| | | | | | 105/3 |
| 4,903,612 | A | * | 2/1990 | Sassa | B60D 5/006 |
| | | | | | 105/18 |
| 5,953,997 | A | * | 9/1999 | Andre | B61D 17/20 |
| | | | | | 105/4.1 |
| 6,076,470 | A | * | 6/2000 | Koch | B60D 5/006 |
| | | | | | 105/14 |
| 6,401,626 | B1 | | 6/2002 | Goebels | |
| 7,549,378 | B2 | * | 6/2009 | Albert | B62D 47/025 |
| | | | | | 105/3 |

FOREIGN PATENT DOCUMENTS

| | | | | | |
|---|---|---|---|---|---|
| CN | 105857392 | A | * | 8/2016 | |
| CN | 113264109 | A | * | 8/2021 | |
| EP | 2497701 | A1 | * | 9/2012 | ............... B60D 5/00 |
| FR | 896039 | A | * | 2/1945 | ............ B61D 17/20 |
| FR | 2551698 | | | 3/1985 | |
| FR | 2570992 | A1 | * | 4/1986 | ............ B61D 17/20 |
| GB | 2126965 | A | * | 4/1984 | ............ B61D 17/22 |
| KR | 20160033681 | A | * | 3/2016 | |
| WO | WO-9742045 | A1 | * | 11/1997 | ............ B61D 17/20 |

* cited by examiner

ARTICULATION SYSTEM FOR COMMERCIAL ROAD VEHICLES

TECHNICAL FIELD

The present disclosure generally relates to articulated and multi-articulated road vehicles and, more particularly, to an articulation system to couple together two adjacent units of an articulated or multi-articulated road vehicle.

BACKGROUND

Articulation systems for commercial road vehicles including low-floor commercial vehicles, such as articulated buses or bi-articulated buses, are well known. Such systems typically comprise two rigid frames fixed to each vehicle units and linked by a pivoting platform at the floor level. The system is typically enclosed by flexible and folding bellows (or sometimes corrugated bellows) inside and outside of the articulation. Such an articulation system is typically about 1.6-meter long. This space between two vehicle units is generally considered as of limited use with room for few standees. To overcome this shortcoming, a common trend is to figure out how to minimize the space the articulation occupies to accommodate another row of seats in the vehicle units.

Most of known bus articulations were designed for one of the two traditional concepts, pusher or puller vehicles. Pusher vehicles have the driving axle, engine and transmission in the trailer unit. Puller vehicles have the drivetrain in the leading unit. Except for the leading unit, all following units have only one axle on the rear. With the advent of electric drivetrains, more advanced road vehicle concepts are now considering vehicle units with two axles where at least one is a drive axle. Prior art articulation systems provide three degrees of freedom, corresponding to the three relative rotation motions between two units of a vehicle. This function is generally integrated into the pivoting platform at the floor level which comprises a roll joint, a pitch joint and a yaw (buckling) joint with damping mechanisms. However, articulated road vehicles having a front and a rear axle on each unit will require the articulation system to have a fourth degree of freedom corresponding to the up and down translation motion between the units.

With known articulation systems, the maximum turn angle is typically 55 degrees. More advanced multi-articulated road vehicle concepts where each unit has two axles and where all axles are steerable may benefit from the ability to reach a maximum turn angle of 90 degrees There is, thus, a need to provide a new intermediate passenger-carrying compartments acting as an articulation system for road vehicles characterized by an improved maneuverability and additional useable interior space.

SUMMARY

Therefore, in accordance with a general aspect of the present disclosure, there is provided an articulation system that may permit a maximum turn angle of 90 degrees between two units of an articulated or multi-articulated road vehicle, the articulation system having four degrees of freedom (rolling, pitching, yawing and vertical translation). At least some of said degree of freedom may also have damping and control mechanisms.

According to another general aspect, there is provided an articulation system adapted for vehicles having a plurality of units where each unit has a front and a rear axle.

In accordance with another general aspect, there is provided an articulation system between first and second vehicle units of an articulated road vehicle, the system including a vertical cylinder with two facing openings for permitting passage of passengers therethrough and comprising two interconnecting structures rotatable around the cylinder and joined respectively to the first vehicle unit and the second vehicle unit.

In accordance with a further general aspect, there is provided an articulation system for interconnecting a first and a second vehicle unit of an articulated road vehicle, the articulation system comprising: a central element including a vertical cylinder with left and right arcuate walls extending between two facing openings for permitting passage of persons therethrough; and first and second interconnecting structures joined to the central element, the first and second interconnecting structures adapted to be respectively attached to the first vehicle unit and the second vehicle unit on opposed sides of the central element; each of said first and second interconnecting structures comprising a pitch joint member and a yaw joint member; said pitch joint member comprising a frame perpendicular to a longitudinal axis of a corresponding one of the first and second vehicle units and a pitch hinge mechanism at a floor level to interconnect with the corresponding one of the first and second vehicle units; said yaw joint member comprising a frame perpendicular to the longitudinal axis of the corresponding one of the first and second vehicle units and left and right arcuate walls juxtaposed to said left and right arcuate walls of the vertical cylinder and rotatable around said vertical cylinder; the frame of the pitch joint member and the frame of the yaw joint member being juxtaposed and mechanically linked to jointly form a planar roll joint mechanism.

In accordance with a still further general aspect, there is provided an articulation system between first and second vehicle units of an articulated road vehicle, the system including a vertical cylinder with two facing openings for permitting passage of passengers therethrough and comprising two interconnecting structures rotatable around the cylinder and joined respectively to the first vehicle unit and the second vehicle unit.

According to still another aspect, rather than providing an articulation in the form of a low-platform with a swivel joint controlling the yawing movement as usually seen for articulated buses, there is provided an articulation in the form of a vertical cylinder where the arcuate walls create the swivel or yaw joint. According to one aspect of the system, the usual flexible and folding bellows are replaced by a rigid structure of moving parts.

In accordance with another aspect, there is provided an articulation system having a roll joint mechanism that spreads the mechanical stress over a planar surface rather than having it concentrated into a localized point.

In accordance with a still further aspect, there is provided an articulation system which is designed to provide more useful interior space, large enough to be a passenger-carrying compartment, and to allow for curved rows of seats along the interior arcuate walls of the articulation.

According to still a further aspect, there is provided a mechanical linkage mechanism using four pairs of piggyback hydraulic cylinders to control the angular position of the first unit and of the second unit.

In accordance with a still further general aspect, there is provided an articulation system for interconnecting a first and a second vehicle unit of an articulated road vehicle, the articulation system comprising at least one planar roll joint mechanism having two frames juxtaposed, said two frames having interlocking thread patterns on respective interfacing faces thereof, the interlocking thread patterns including arcs of concentric circles; said planar roll joint mechanism being rotatable according to said interlocking thread patterns.

DETAILED DESCRIPTION

Figure 1:
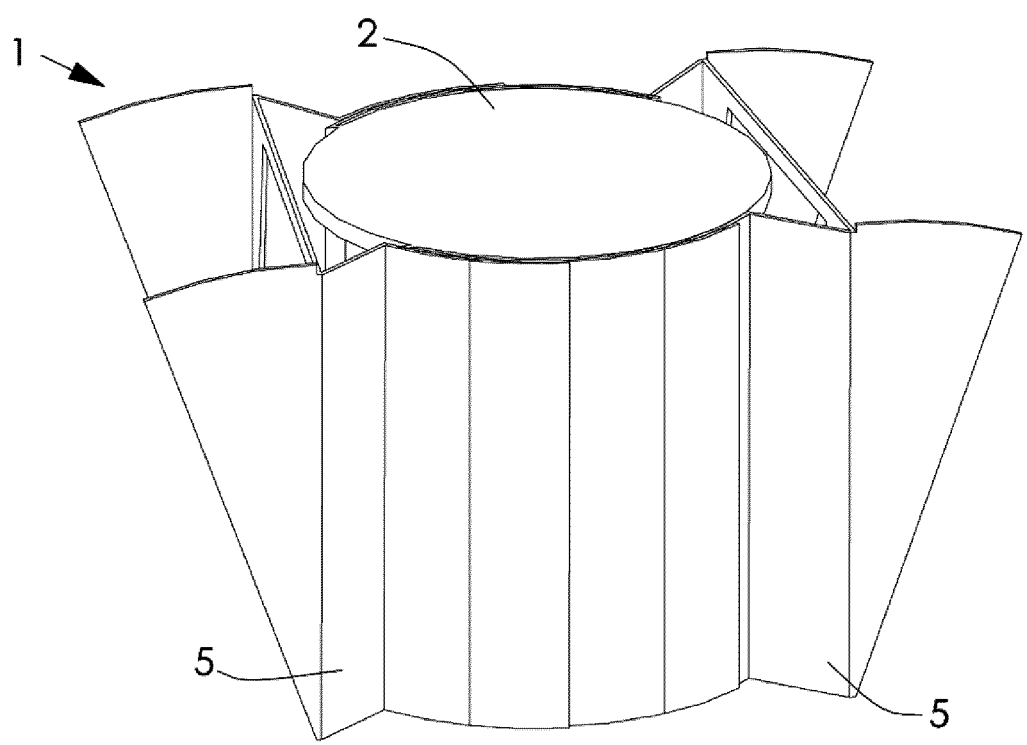
FIG. 1 is a perspective view of an articulation system in accordance with an embodiment of the present invention.
Figure 5:
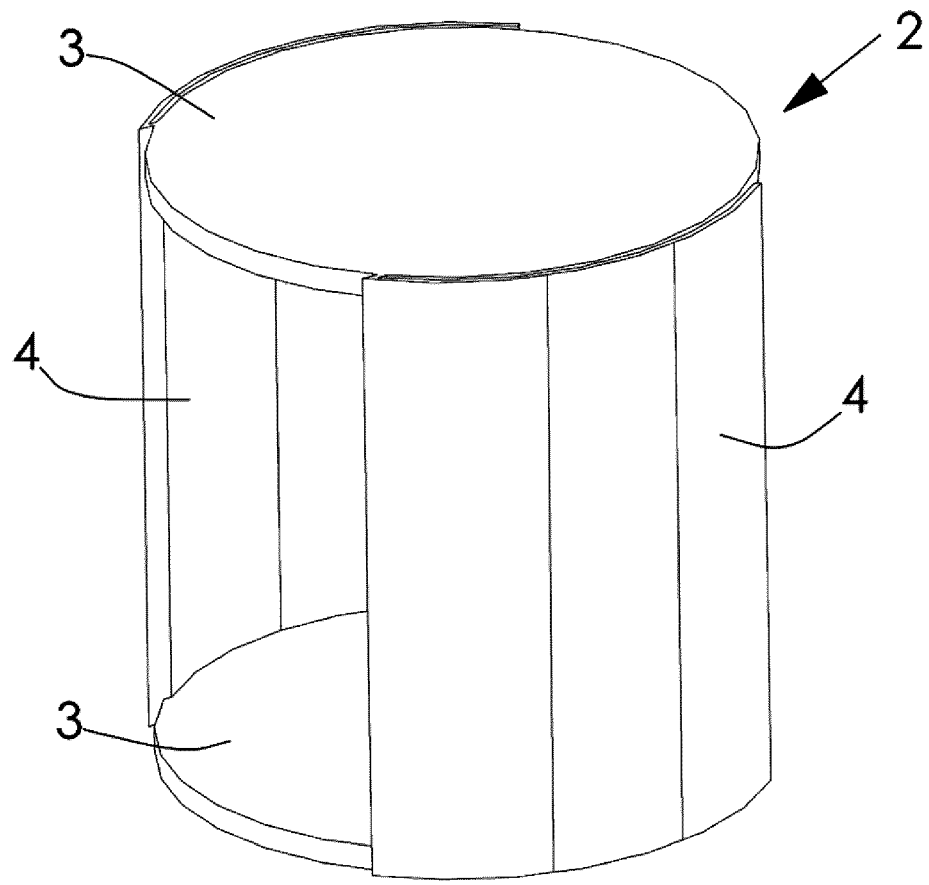
FIG. 5 is a perspective view of a central element of the articulation system shown in FIG. 1, the central element having the shape of a vertical cylinder.
Figure 6:
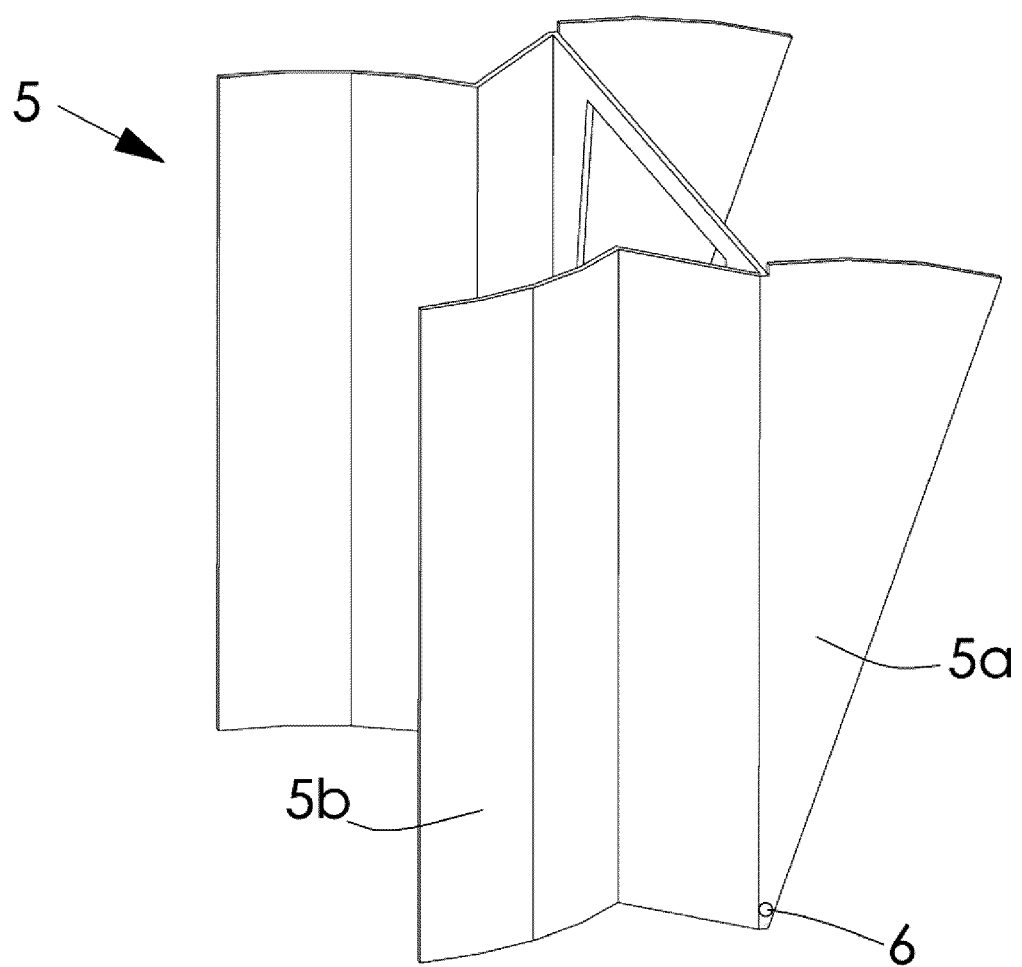
FIG. 6. is a perspective view of one of the interconnecting structure shown in FIG. 1.
Figure 11:
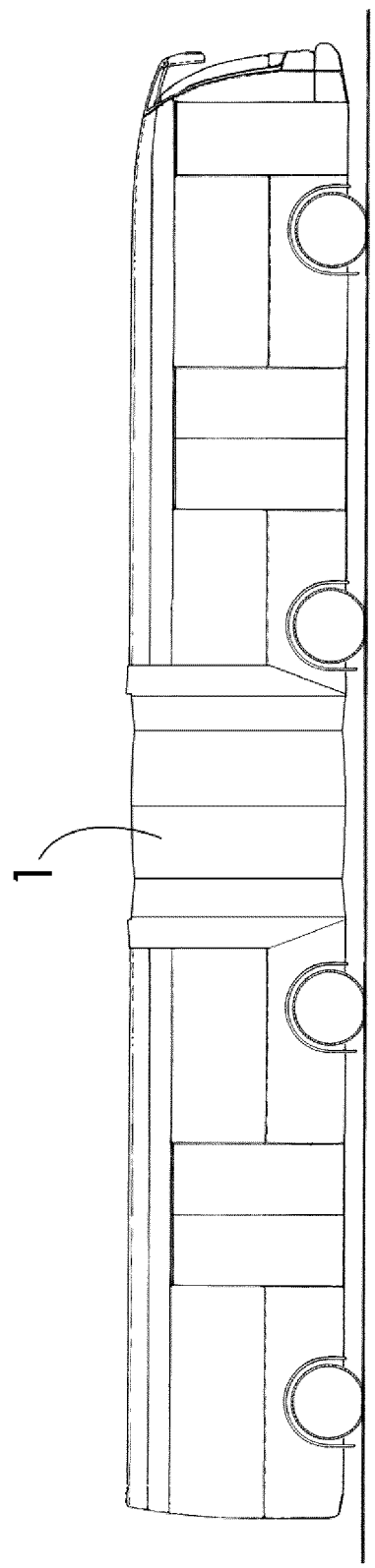
FIG. 11 illustrates an example of a road vehicle having two units joined to one another by the articulation system shown in FIG. 1.

FIG. 1 illustrates an embodiment of an articulation system (1) and FIG. 11 illustrates the articulation system (1) interconnecting two vehicle units of a road vehicle. The articulation system (1) comprises a central element (2) having the general shape of a vertical cylinder with two facing openings for permitting passage of passengers therethrough. As best shown in FIG. 5, the central element (2) may consist of an assembly of two facing circular structures (3) for the top and the bottom, and two arcuate walls (4). Still referring to FIG. 1, it can be seen that the central element (2) is joined to two interconnecting structures (5) attached respectively to each vehicle unit on opposed sides of the central element (2). Referring concurrently to FIGS. 1 and 6-8, it can be appreciated that each of the interconnecting structures (5) has a pitch joint member (5a) interconnecting with a vehicle unit by means of a pitch hinge mechanism (6) at the floor level allowing the vehicle unit to pitch up or down relative to the central element (2). The combined effect of the two pitch hinge mechanisms (6) on each side of the central element (2) allows for the up and down relative translation motion between the two vehicle units. Each of the interconnecting structures (5) also comprises a yaw joint member (5b) having arcuate walls juxtaposed to the arcuate walls of the central element (2) and capable to rotate around the central element (2), thereby permitting the relative yawing motion between the vehicle unit and the central element (2).

Figure 10:
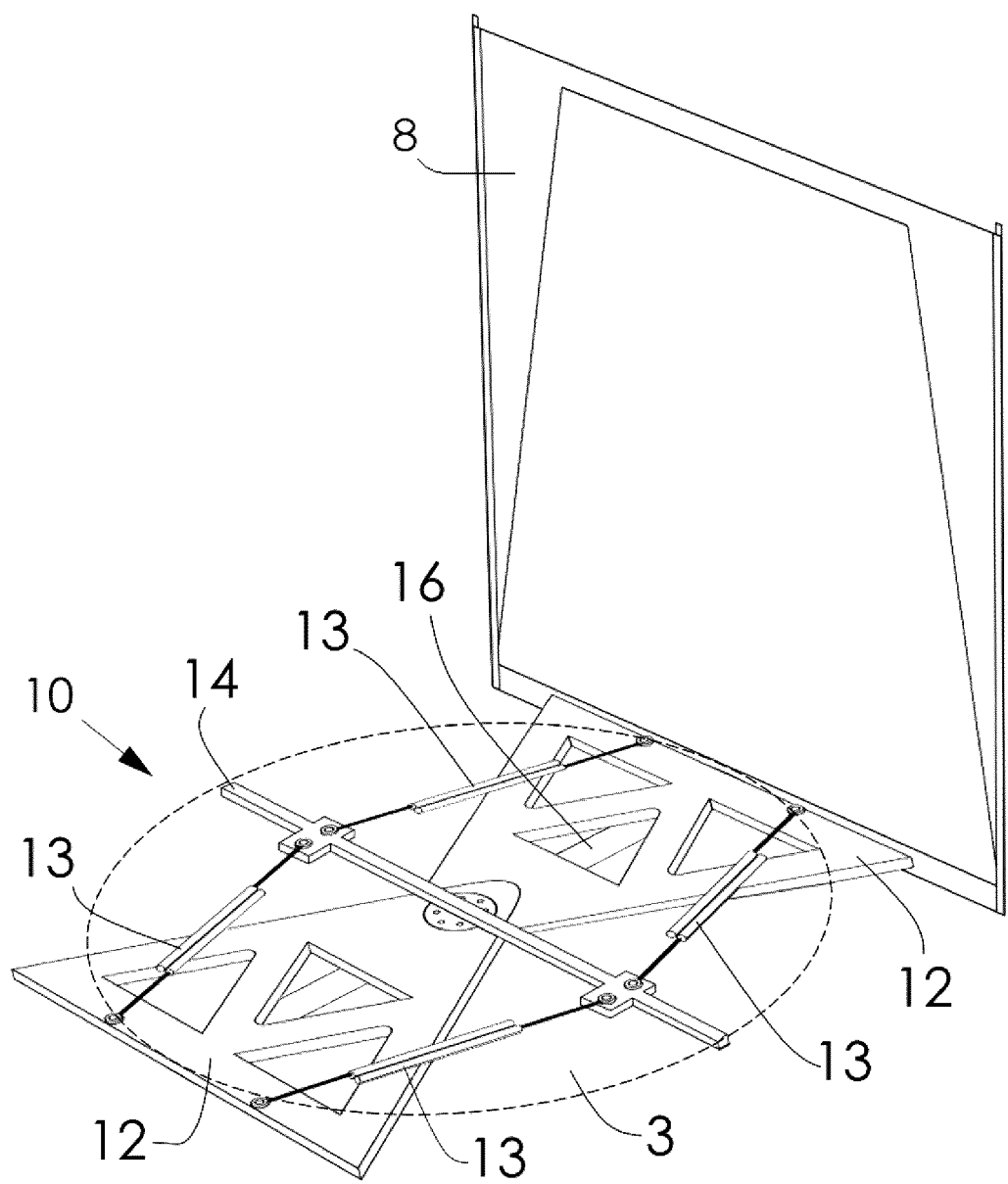
FIG. 10 is a perspective view of a linkage mechanism in the bottom structure of the central element of the articulation system.

The interconnecting structures (5) can be interconnected through mechanical linkages (10) (shown in FIG. 10) inside the top and bottom circular structures (3) of the central element (2) to control the yawing motion. According to one embodiment, the mechanical linkages (10) comprise a pair of triangular shaped structures (12). The first and the second triangular shaped structures (12) are respectively attached at their base to the frame (8) of the corresponding first yaw joint member and second yaw joint member. The two triangular shaped structures (12) are joined together at their apex by means of a rotatable joint. According to one further embodiment and referring more particularly to FIG. 10, the mechanical linkages (10) inside the bottom circular structures (3) also comprise four pairs of piggy-back hydraulic cylinders (13) to control the position of the central element (2) so the angle of each interconnecting structure (5) relative to the neutral axis of the passage inside the central element (2) is the same. Each pair of piggy-back hydraulic cylinders (13) is attached at a first end to one side of the base of one triangular shaped structure (12) and at the second end to a transversal bar (14) rigidly mounted to the diameter of the bottom structure of the central element (2). The piggy-back hydraulic cylinders (13) are linked by means of hydraulic lines maintaining a constant fluid volume between two diagonally opposed pairs of piggy-back cylinders.

Figure 2:
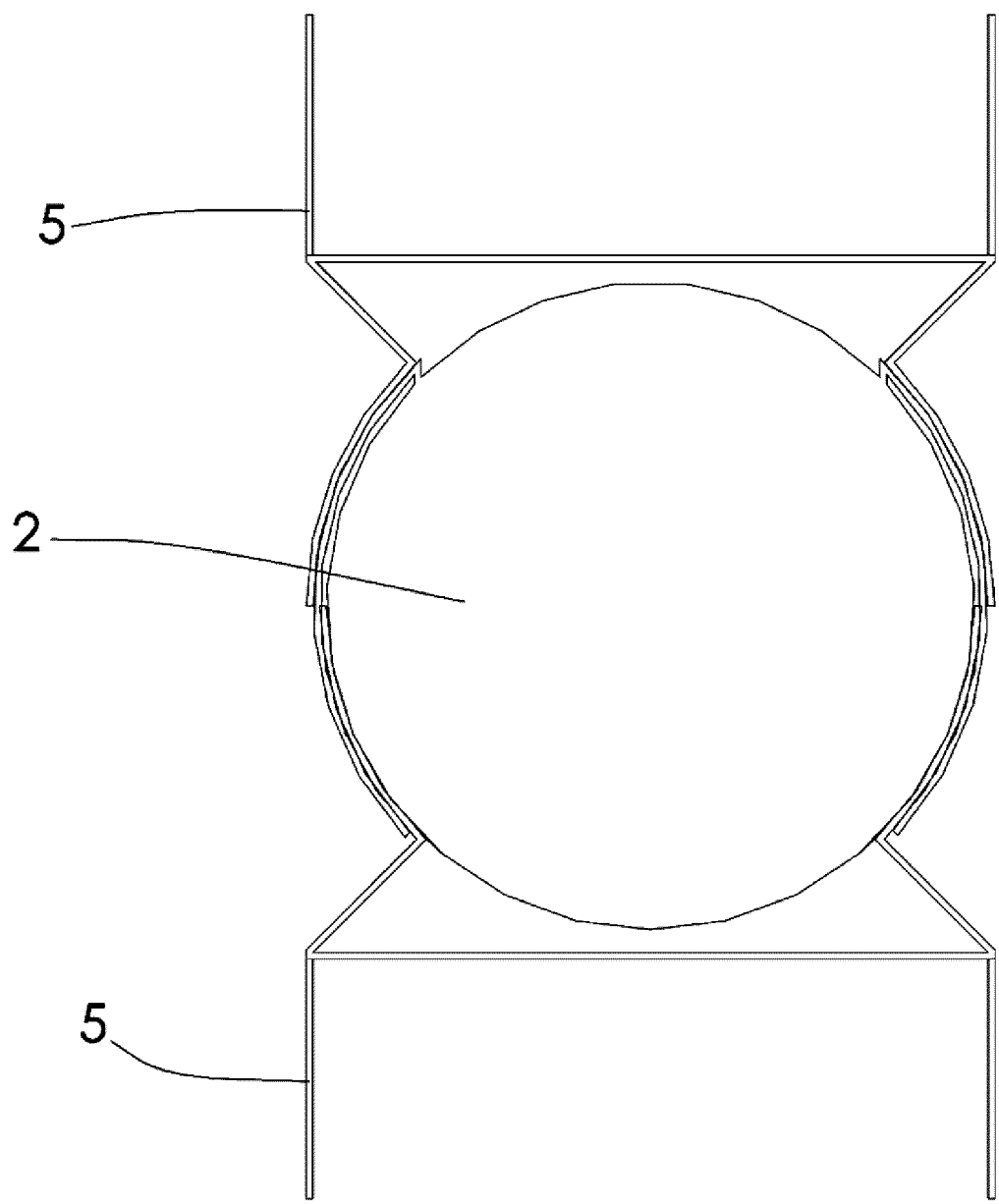
FIG. 2 is a top view of the articulation system shown in FIG. 1.
Figure 3:
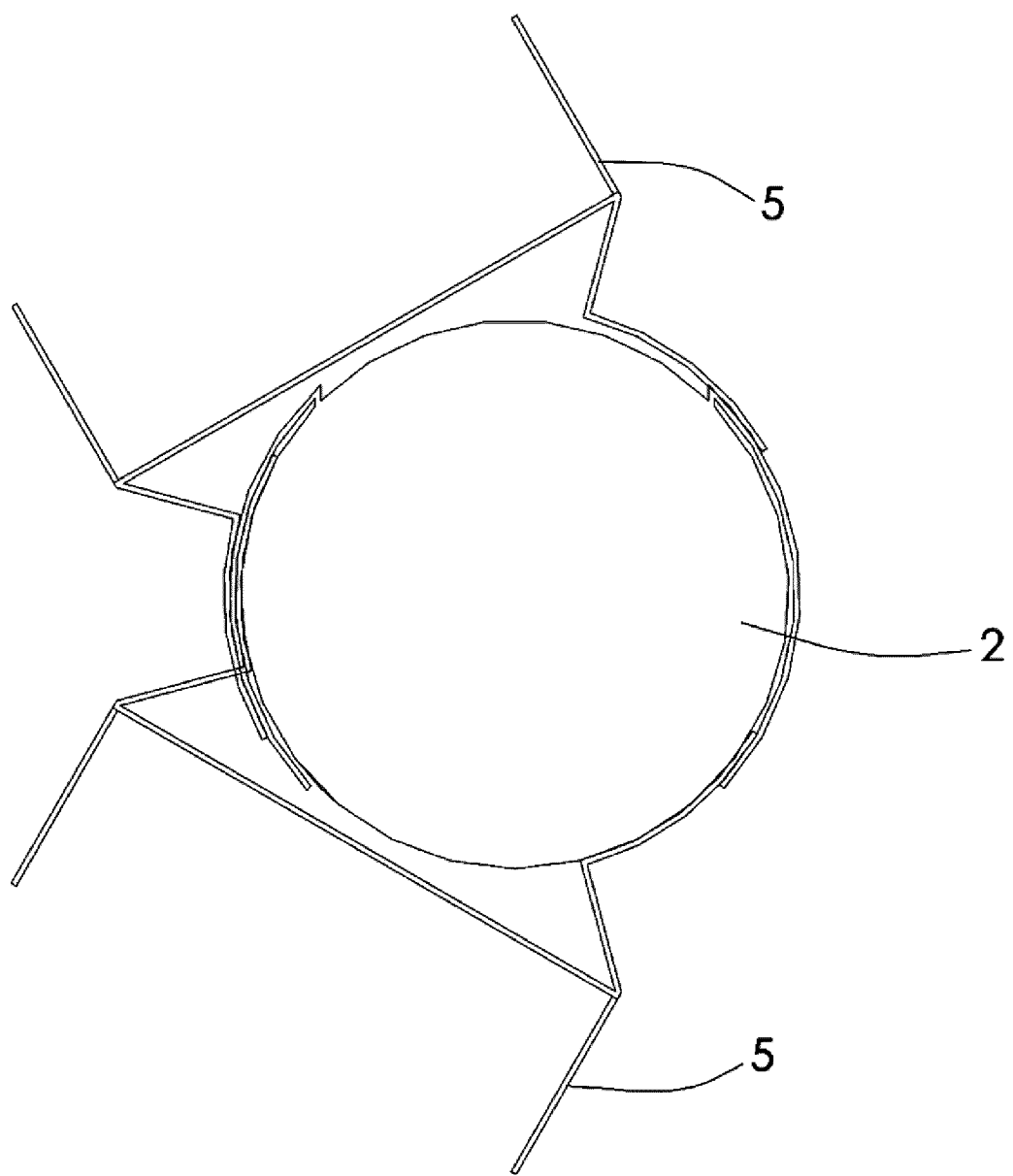
FIG. 3 is a top view of the articulation system shown in FIG. 1 with a different turn angle.
Figure 4:
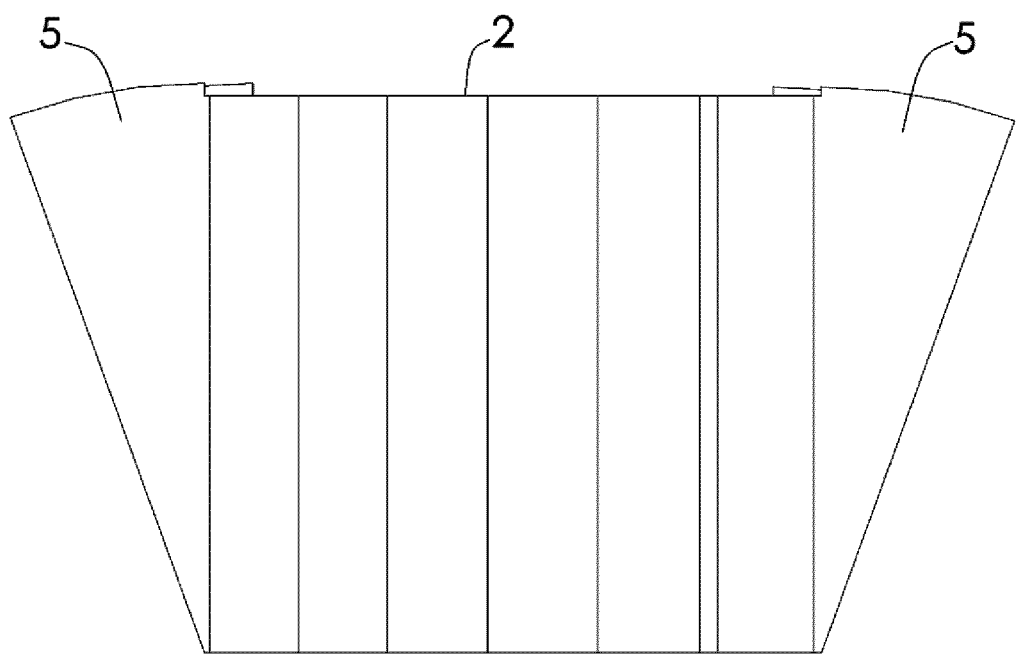
FIG. 4 is a side view of the articulation system shown in FIG. 1.

According to one embodiment, each of the arcuate walls (4) of the central element (2) comprises a fixed panel and sliding and overlapping panels. According to another embodiment, each of the arcuate walls of a yaw joint member (5b) comprises a fixed panel and sliding and overlapping panels. According to a further embodiment, each of the arcuate walls of the central element (2) and of the yaw joint members (5b) comprises a fixed panel and sliding and overlapping panels. The overlapping panels can expand or contract the arcuate walls of a yaw joint member (5b) and/or of the central element (2) according to the turn angle of the articulation system, as shown in FIGS. 2 and 3, by being guided by the position of the mechanical linkages (10) controlling the angle of each interconnecting structure.

Figure 7:
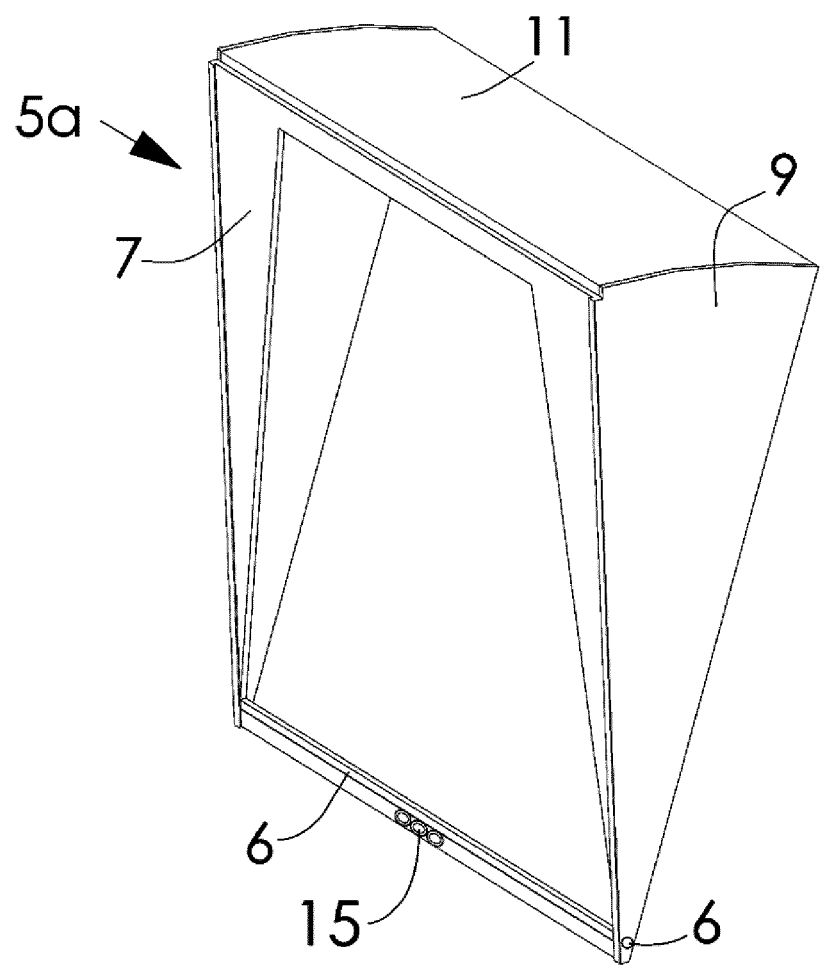
FIG. 7. is a perspective view of the pitch joint member of the interconnecting structure shown in FIG. 6.
Figure 8:
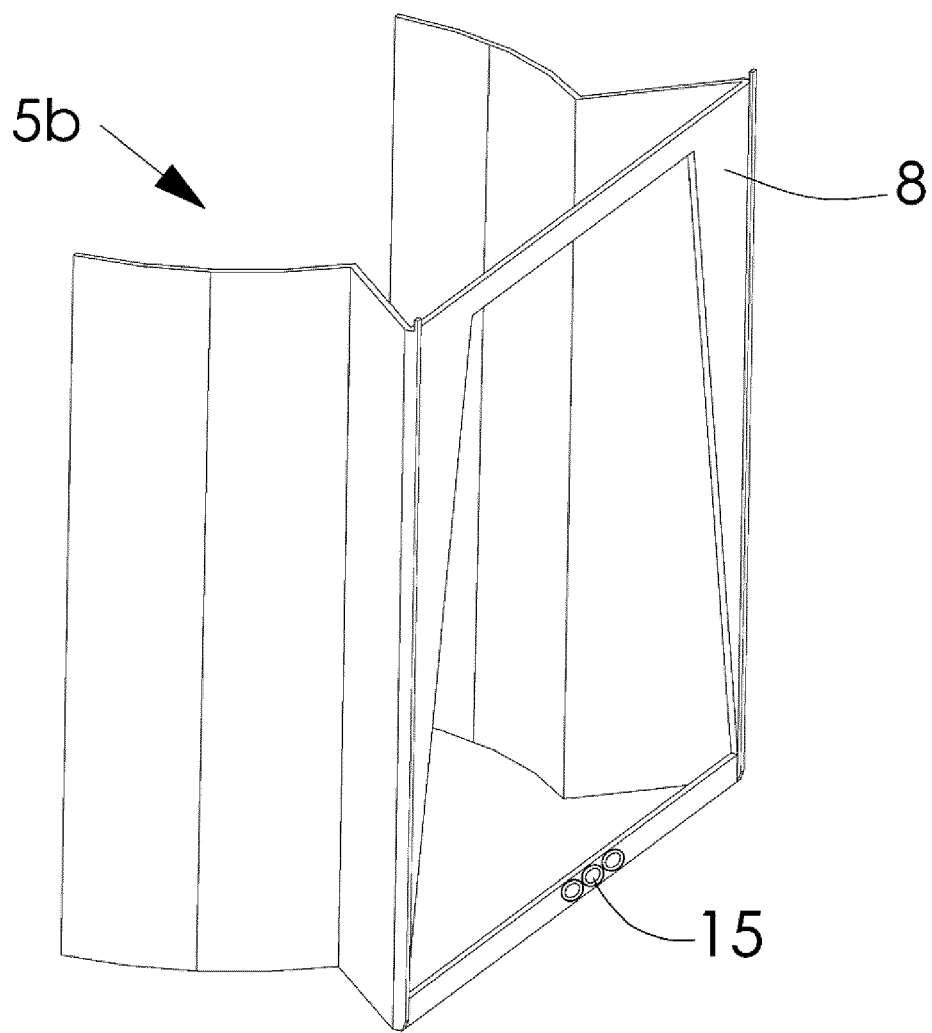
FIG. 8. is a perspective view of the yaw joint member of the interconnecting structure shown in FIG. 6.
Figure 9:
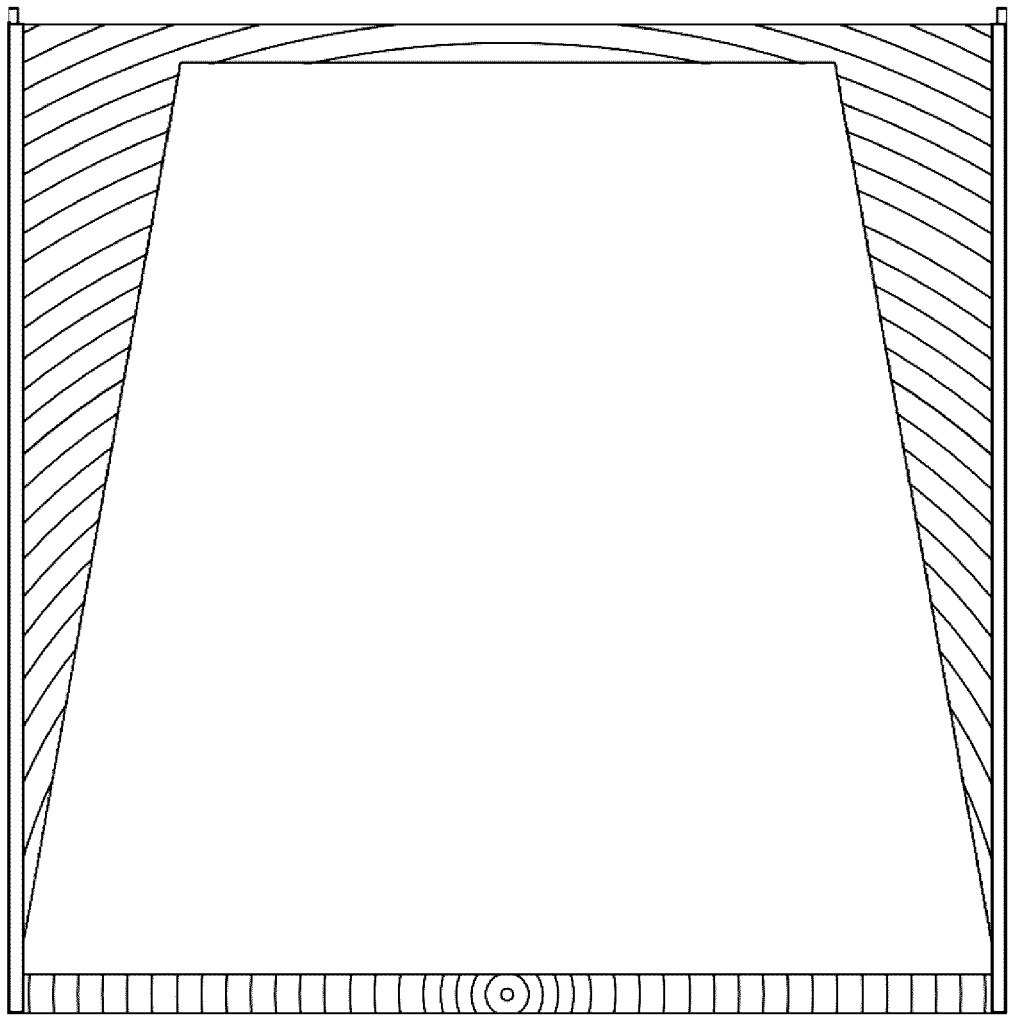
FIG. 9 is a front view of the frame of the pitch joint member or of the yaw joint member illustrating an example of thread patterns thereof.

As illustrated in FIG. 7, the pitch joint member (5a) comprises a rigid frame (7) perpendicular to the longitudinal axis of the vehicle unit and two side panels (9), one on each left and right side. The top of this assembly being completed by an arcuate surface (11) to close the gap between the roof of the vehicle unit and the pitch joint member (5a) while allowing for a relative pitch movement between them. As illustrated in FIG. 8, the yaw joint member (5b) also comprises a rigid frame (8) perpendicular to the longitudinal axis of the vehicle unit. Each of the frames (7) and (8) has interlocking thread patterns, as shown in FIG. 9, on one of its face. The interlocking thread patterns have the shape of arcs of concentric circles. The frames (7) and (8) are tightly juxtaposed to jointly form a planar roll joint mechanism configured to slightly rotate, typically up to 5 degrees in both directions, according to the thread pattern. The center of the concentric circles is the center of rotation of the roll joint mechanism and is located in the middle of the bottom section of each of frame (7) and (8). With such a planar roll joint mechanism, the mechanical stress is distributed across the whole face of each frame (7) and (8) rather than concentrated into a single point such as a roll bearing.

As shown in FIGS. 7 and 8, coupling members (15) for electrical, compressed air and/or hydraulic lines are provided in the floor region on each of frame (7) and (8) of the two interconnecting structures (5) coupled to each vehicle units in order to transport energy and data from one vehicle unit to the other. The floor structure of the vertical cylinder also comprises proper electrical, compressed air and/or hydraulic line mechanisms (16).

Those skilled in the art will understand that the articulation system may incorporate well known damping and spring-loaded mechanisms, such as the hydraulic cylinders (13) in the mechanical linkage mechanism (10) for the yaw motion, to control each of the four degrees of freedom. It may also incorporate well known flexible waterproofing membranes or equivalent means to provide watertight sealing for each joint element.

According to one embodiment, the central element (2) has a diameter in the order of 2.5 meters and each arcuate interior wall can accommodate a curved row of seats. Rather than trying to minimize the length of the articulation system, there is provided an articulation system which is longer and constructed with rigid wall panels, creating useful interior space for passengers, and allowing for a better management of the relative motion between the two vehicle units.

It is contemplated to use the articulation system (1) for articulated or multi-articulated road vehicles, such as city buses, trambuses and even trucks, where each vehicle unit comprises a font and a rear axle. More specifically, it is contemplated to use the articulation system (1) for multi-articulated vehicles where all axles are steerable, and all rear axles of each unit are electric drive axles.

The invention claimed is:

1. An articulation system for interconnecting a first and a second vehicle unit of an articulated road vehicle, the articulation system comprising: a central element including a vertical cylinder with left and right arcuate walls extending between two facing openings for permitting passage of persons therethrough; and first and second interconnecting structures joined to the central element, the first and second interconnecting structures adapted to be respectively attached to the first vehicle unit and the second vehicle unit on opposed sides of the central element; each of said first and second interconnecting structures comprising a pitch joint member and a yaw joint member; said pitch joint member comprising a frame perpendicular to a longitudinal axis of a corresponding one of the first and second vehicle units and a pitch hinge mechanism at a floor level to interconnect with the corresponding one of the first and second vehicle units; said yaw joint member comprising a frame perpendicular to the longitudinal axis of the corresponding one of the first and second vehicle units and left and right arcuate walls juxtaposed to said left and right arcuate walls of the vertical cylinder and rotatable around said vertical cylinder; the frame of the pitch joint member and the frame of the yaw joint member being juxtaposed and mechanically linked to jointly form a planar roll joint mechanism.

2. The articulation system according to claim 1, wherein each of left and right arcuate walls of the vertical cylinder is configured to expand or contract by comprising a fixed panel and sliding and overlapping panels.

3. The articulation system according to claim 1, wherein the left and right arcuate walls of each said yaw joint member is configured to expand or contract by comprising a fixed panel and sliding and overlapping panels.

4. The articulation system according to claim 1, wherein the frame of the pitch joint member and the frame of the yaw joint member have interlocking thread patterns on respective interfacing faces thereof, the interlocking thread patterns including arcs of concentric circles; said planar roll joint mechanism formed by said frames of the pitch joint member and the yaw joint member being rotatable according to said interlocking thread patterns.

5. The articulation system according to claim 1, wherein the first and second interconnecting structures are interconnected through mechanical linkages inside top and bottom structures of said vertical cylinder to control the yawing motion.

6. The articulation system according to claim 5, wherein said mechanical linkages comprise a first and a second triangular shaped structure respectively attached at a base thereof to the frame of the corresponding first and second interconnecting structure; said triangular shaped structures being joined together at their apex by means of a rotatable joint.

7. The articulation system according to claim 6, wherein said mechanical linkages further comprise four pairs of piggy-back hydraulic cylinders mounted on said triangular shaped structures and on a transversal bar fixed to the bottom structure of said vertical cylinder, and wherein two diagonally opposed pairs of said piggy-back hydraulic cylinders are connected by hydraulic lines to maintain a constant combined fluid volume.

8. The articulation system according to claim 1, wherein each of said pitch joint member also comprises left and right side panels, said left and right side panels having a top arcuate surface.

9. The articulation system according to claim 1, wherein coupling members for electrical, compressed air and/or hydraulic lines are provided in a floor region of each of said first and second interconnecting structures; and wherein said bottom structure of said vertical cylinder comprises electrical, compressed air and/or hydraulic line mechanisms.

10. A road vehicle comprising at least one articulation system according to claim 1.

11. The road vehicle according to claim 10, wherein each of the first and second vehicle units has a front and a rear axle.

12. The road vehicle according to claim 11, wherein each of the front and rear axles is configured to be steerable.

13. An articulation system for interconnecting a first and a second vehicle unit of an articulated road vehicle, the articulation system comprising at least one planar roll joint mechanism having two frames juxtaposed, said two frames having interlocking thread patterns on respective interfacing faces thereof, the interlocking thread patterns including arcs of concentric circles; said planar roll joint mechanism being rotatable according to said interlocking thread patterns.

* * * * *